US011792544B2

United States Patent
Yokokawa et al.

(10) Patent No.: US 11,792,544 B2
(45) Date of Patent: Oct. 17, 2023

(54) IMAGE PROCESSING DEVICE, IMAGE PROCESSING METHOD, AND IMAGING DEVICE FOR GENERATION OF HIGH-RESOLUTION IMAGE

(71) Applicant: SONY GROUP CORPORATION, Tokyo (JP)

(72) Inventors: Masatoshi Yokokawa, Tokyo (JP); Hideyuki Ichihashi, Tokyo (JP); Tomohiro Nishi, Tokyo (JP); Yiwen Zhu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 72 days.

(21) Appl. No.: 17/435,279

(22) PCT Filed: Dec. 18, 2019

(86) PCT No.: PCT/JP2019/049567
§ 371 (c)(1),
(2) Date: Aug. 31, 2021

(87) PCT Pub. No.: WO2020/188926
PCT Pub. Date: Sep. 24, 2020

(65) Prior Publication Data
US 2022/0159205 A1    May 19, 2022

(30) Foreign Application Priority Data
Mar. 19, 2019 (JP) .................................. 2019-050800

(51) Int. Cl.
*H04N 25/704* (2023.01)
*G06T 5/00* (2006.01)
*H04N 25/60* (2023.01)

(52) U.S. Cl.
CPC ........... *H04N 25/704* (2023.01); *G06T 5/002* (2013.01); *H04N 25/60* (2023.01); *G06T 2207/20016* (2013.01)

(58) Field of Classification Search
CPC ...... H04N 25/704; H04N 25/60; H04N 25/46; H04N 23/55; H04N 23/00; H04N 23/80;
(Continued)

(56) References Cited

U.S. PATENT DOCUMENTS

| 2012/0300104 A1* | 11/2012 | Onuki ................. H04N 23/672 348/E5.091 |
| 2017/0171470 A1 | 6/2017 | Sakioka et al. |

(Continued)

FOREIGN PATENT DOCUMENTS

| CN | 105580352 A | 5/2016 |
| JP | 2014-045275 A | 3/2014 |

(Continued)

OTHER PUBLICATIONS

International Search Report and Written Opinion of PCT Application No. PCT/JP2019/049567, dated Mar. 10, 2020, 09 pages of ISRWO.

*Primary Examiner* — Gevell V Selby
(74) *Attorney, Agent, or Firm* — CHIP LAW GROUP

(57) ABSTRACT

A pixel addition processing unit 35 adds pupil division pixel signals with a plurality of different addition patterns in pupil units to generate a pixel addition image for each addition pattern. Further, the pixel addition processing unit 35 may use a pupil division pixel signal in which a sensitivity difference between pupil division pixels has been corrected, and the addition pattern may be set on the basis of image characteristic information calculated by using the pupil division pixel signal. A super-resolution processing unit 36 performs super-resolution processing using a pixel addition image signal generated for each addition pattern by the pixel (Continued)

addition processing unit 35 to generate an image signal with a higher resolution than that of the pixel addition image signal. A high-resolution image can be generated using pupil division.

10 Claims, 17 Drawing Sheets

(58) Field of Classification Search
CPC .............. H04N 23/951; G06T 5/002; G06T 2207/20016
See application file for complete search history.

(56) References Cited

U.S. PATENT DOCUMENTS

| | | |
|---|---|---|
| 2018/0160067 A1 | 6/2018 | Sakioka et al. |
| 2019/0158759 A1* | 5/2019 | Hatakeyama ........ H04N 23/672 |
| 2019/0172867 A1* | 6/2019 | Murata ................ H04N 23/672 |
| 2019/0268544 A1* | 8/2019 | Okubo ................. H04N 23/672 |

FOREIGN PATENT DOCUMENTS

| | | |
|---|---|---|
| JP | 2016-052041 A | 4/2016 |
| JP | 2018-004689 A | 1/2018 |
| WO | 2016/035566 A1 | 3/2016 |
| WO | 2018/163843 A1 | 9/2018 |

\* cited by examiner

10

▨ : RED COMPONENT PIXEL

▩ : GREEN COMPONENT PIXEL

▧ : BLUE COMPONENT PIXEL

Fig. 13

| HORIZONTAL DIFFERENTIAL COMPONENT | VERTICAL DIFFERENTIAL COMPONENT | DYNAMIC RANGE | ADDITION PATTERN |
|---|---|---|---|
| — | — | $Sd \leq THd$ | ONLY ALL-PIXEL ADDITION |
| $Sh > THh$ | $Sv \leq THv$ | $Sd > THd$ | ONLY HORIZONTAL ADDITION |
| $Sh \leq THh$ | $Sv > THv$ | $Sd > THd$ | ONLY VERTICAL ADDITION |
| $Sh > THh$ | $Sv > THv$ | $Sd > THd$ | ONLY DIAGONAL ADDITION |

FIG. 14B 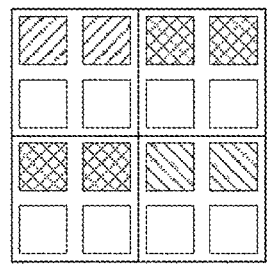 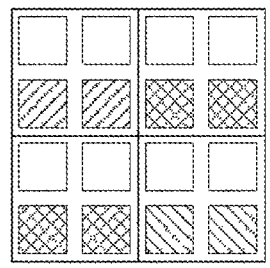
FIG. 14C 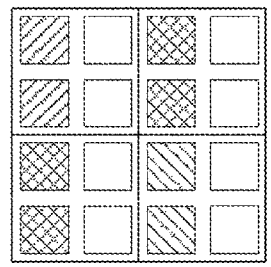 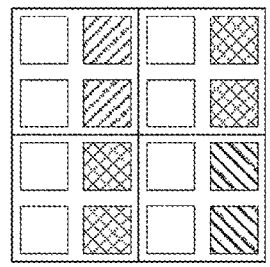
FIG. 14D 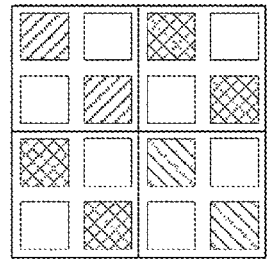 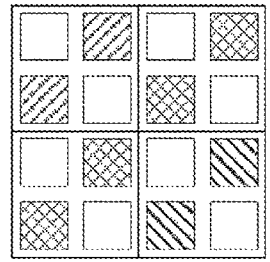

⬇ PIXEL ADDITION PROCESSING

⬇ PIXEL ADDITION PROCESSING

▨ : ADDITION TARGET PUPIL DIVISION PIXEL (RED COMPONENT)

▩ : ADDITION TARGET PUPIL DIVISION PIXEL (GREEN COMPONENT)

▧ : ADDITION TARGET PUPIL DIVISION PIXEL (BLUE COMPONENT)

☐ : NON-ADDITION PUPIL DIVISION PIXEL

▨ : RED COMPONENT PIXEL

▩ : GREEN COMPONENT PIXEL

▧ : BLUE COMPONENT PIXEL

● : CENTROID

IMAGE PROCESSING DEVICE, IMAGE PROCESSING METHOD, AND IMAGING DEVICE FOR GENERATION OF HIGH-RESOLUTION IMAGE

CROSS REFERENCE TO RELATED APPLICATIONS

This application is a U.S. National Phase of International Patent Application No. PCT/JP2019/049567 filed on Dec. 18, 2019, which claims priority benefit of Japanese Patent Application No. JP 2019-050800 filed in the Japan Patent Office on Mar. 19, 2019. Each of the above-referenced applications is hereby incorporated herein by reference in its entirety.

TECHNICAL FIELD

The present technology relates to an image processing device, an image processing method, a program, and an imaging device, and enables a high-resolution image to be generated using pupil division.

BACKGROUND ART

In the related art, a high-resolution image is generated by using a pixel signal of each division pixel obtained by pupil division in which a plurality of pixels are provided directly under one microlens (on-chip lens). For example, in PTL 1, a parallax is detected in pupil units on the basis of a pixel signal of each division pixel obtained by pupil division, and the pixel signals of the division pixels are added up in pupil units depending on the parallax so that an addition pixel signal is obtained.

CITATION LIST

Patent Literature

[PTL 1]
WO 2018/163843

SUMMARY

Technical Problem

Incidentally, in PTL 1, since the pixel signals of the division pixels are added up in pupil units depending on the parallax so that the addition pixel signal is obtained, it is not possible to obtain an image with a higher resolution than that of each pupil unit.

Therefore, an object of the present technology is to provide an image processing device, an image processing method, a program, and an imaging device capable of generating a high-resolution image by using pupil division.

Solution to Problem

A first aspect of the present technology is an image processing device including: a pixel addition processing unit configured to add pupil division pixel signals with a plurality of different addition patterns in pupil units to generate a pixel addition image for each addition pattern; and an image generation processing unit configured to perform image processing using the pixel addition image generated for each addition pattern by the pixel addition processing unit to generate an output image with a higher resolution than the pixel addition image.

In the present technology, in the pixel addition processing unit, the pupil division pixel signals are added with the plurality of different addition patterns in pupil units, and the pixel addition image is generated for each addition pattern. In the pupil division pixel signal, an inter-pixel sensitivity difference between the pupil division pixels is corrected by a sensitivity difference correction unit. Further, in the pixel addition processing unit, a plurality of different addition patterns are determined on the basis of at least one of a horizontal differential component, a vertical differential component, and a dynamic range, which are image characteristic information calculated using, for example, the pupil division pixel signal. Further, the pixel addition processing unit performs generation of the pixel addition image while avoiding duplication of addition patterns in which phases of centroids of the pixel addition image are the same. In the image generation processing unit, image processing is performed using the pixel addition image signal generated for each addition pattern by the pixel addition processing unit, and an image signal with a higher resolution than the pixel addition image signal is generated.

A second aspect of the present technology is an image processing method including: adding, by a pixel addition processing unit, pupil division pixel signals with a plurality of different addition patterns in pupil units to generate a pixel addition image for each of the addition patterns; and performing, by an image generation processing unit, image processing using the pixel addition image generated for each addition pattern by the pixel addition processing unit to generate an output image with a higher resolution than the pixel addition image.

A third aspect of the present technology is a program causing a computer to execute image processing in which a pupil division pixel signal has been used, the program causing the computer to execute: a procedure of adding pupil division pixel signals with a plurality of different addition patterns in pupil units to generate a pixel addition image for each of the addition patterns; and a procedure of performing image processing using the pixel addition image generated for each of the addition patterns to generate an output image with a higher resolution than the pixel addition image.

The program of the present technology is a program that can be provided in a general-purpose computer capable of executing various program codes by a storage medium provided in a computer-readable format or a communication medium, for example, a storage medium such as an optical disc, a magnetic disk or a semiconductor memory, or a communication medium such as a network. The provision of such a program in a computer-readable format allows processing according to the program to be realized on the computer.

A fourth aspect of the present technology is an imaging device including: an imaging unit using an image sensor, the image sensor including a plurality of pupil division pixels subjected to pupil division; a pixel addition processing unit configured to add pupil division pixel signals generated by the imaging unit with a plurality of different addition patterns in pupil units to generate a pixel addition image for each addition pattern; and an image generation processing unit configured to perform image processing using the pixel addition image generated for each addition pattern by the pixel addition processing unit to generate an output image with a higher resolution than the pixel addition image.

In the present technology, the imaging unit generates the pupil division pixel signal using an image sensor including a plurality of pupil division pixels subjected to pupil division. The pupil units are color component units or white. Further, in the pupil division pixel signal, for example, an inter-pixel sensitivity difference between the pupil division pixels is corrected by the sensitivity difference correction unit on the basis of sensitivity difference information regarding the sensitivity difference between the pupil division pixels acquired from the imaging unit. In the pixel addition processing unit, the pupil division pixel signals are added with the plurality of different addition patterns in pupil units, and a pixel addition image is generated for each addition pattern. In the image generation processing unit, image processing is performed using the pixel addition image generated for each addition pattern by the pixel addition processing unit, and an output image with a higher resolution than the pixel addition image is generated.

BRIEF DESCRIPTION OF DRAWINGS

FIG. 13 is a diagram illustrating an addition pattern determination operation.

FIGS. 14A, 14B, 14C, and 14D is a are diagrams illustrating addition patterns.

DESCRIPTION OF EMBODIMENTS

Figure 1:
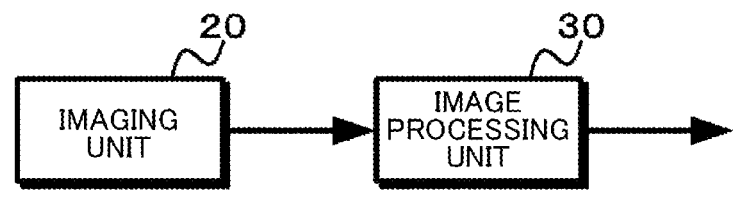
FIG. 1 is a diagram illustrating a configuration of an imaging system.

Hereinafter, embodiments of the present technology will be described. The description will be given in the following order.
1. Imaging system
2. First embodiment
3. Second embodiment
4. Third embodiment
5. Other embodiments
6. Application examples

1. IMAGING SYSTEM

FIG. 1 illustrates a configuration of an imaging system in which an image processing device of the present technology is used. The imaging system 10 includes an imaging unit 20, and the image processing unit 30 corresponding to the image processing device of the present technology.

Figure 2A:
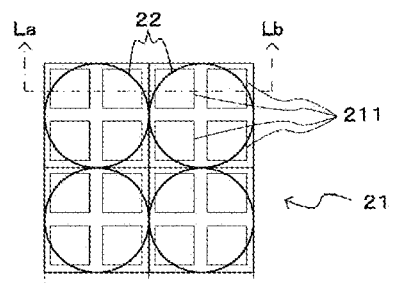
FIGS. 2A, 2B, and 2C are diagrams illustrating a configuration of an imaging unit.
Figure 2C:
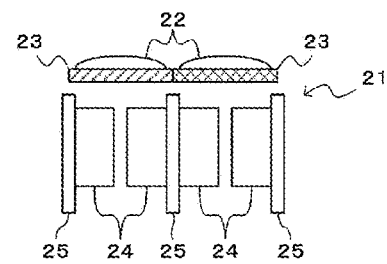
Figure 2B:
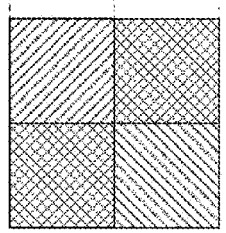

The imaging unit 20 generates an image signal for pupil division. FIGS. 2A, 2B, and 2C illustrate a configuration of the imaging unit. As illustrated in FIG. 2A, an on-chip lens 22 is provided in each of pixels in a pupil unit on an incident light surface of an image sensor 21, and a plurality of photoelectric conversion units 211 (referred to as "pupil division pixels") are provided directly under the on-chip lens 22. A plurality of pupil division pixels arranged within the pupil unit are configured so that a luminous flux passing through different partial pupil regions of an emission pupil of a photographing lens is received through the on-chip lens 22, and pupil division is performed in the image sensor 21. Therefore, in the plurality of pupil division pixels within the pupil unit, a pixel signal (a pupil division pixel signal) for each pupil region after division is generated. In FIG. 2A, for example, the on-chip lens 22 is provided in each 2×2 pixel region, and 2×2 pixels directly under the on-chip lens 22 are pupil division pixels 211.

A color filter 23 in which a pixel region corresponding to one on-chip lens 22 is one pixel of a color component is provided on the incident light surface of the image sensor 21. For example, when the image sensor 21 has a Bayer array, a 2×2 pixel region of the pupil division pixels which is a red component, a 2×2 pixel region of the pupil division pixels which is a blue component, and two 2×2 pixel regions of the pupil division pixels which are a green component are provided in a 4×4 pixel region of the pupil division pixels, as illustrated in FIG. 2B. FIG. 2C illustrates a schematic cross-sectional view at an La-Lb position in FIG. 2A, an optical detection unit 24 is provided within a 2×2 pupil division pixel region, and an element separation layer 25 is provided at a boundary of the 2×2 pupil division pixel region.

The image processing unit 30 adds the pupil division pixel signals generated by the imaging unit 20 with a plurality of different addition patterns in pupil units to generate a pixel addition image for each addition pattern. Further, the image processing unit 30 performs image processing using the plurality of generated pixel addition image signals to generate an image with a higher resolution than the pixel addition image. In the present technology, super-resolution processing is used as the image processing for generating the image with a higher resolution than the pixel addition image using the plurality of pixel addition image signals. Further, a super-resolution processing unit is used as an image generation processing unit that performs image processing using the plurality of pixel addition image signals to generate the image with a higher resolution than the pixel addition image.

2. FIRST EMBODIMENT

Figure 3:
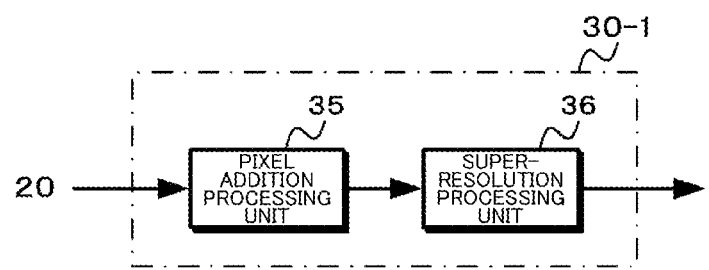
FIG. 3 is a diagram illustrating a configuration of a first embodiment.

FIG. 3 illustrates a configuration of the first embodiment. The image processing unit 30 includes a pixel addition processing unit 35 and a super-resolution processing unit 36.

A pupil division pixel signal is input to the pixel addition processing unit 35. The pixel addition processing unit 35 performs pixel addition processing (also referred to as binning processing) on the basis of an addition pattern for each region of the pupil unit, that is, for each region of a plurality of pupil division pixels located directly under the on-chip lens 22, to generate a pixel addition image in which the pupil units are units of one color component. Further, the pixel addition processing unit 35 performs pixel addition processing of the pupil division pixels with different addition patterns to generate a plurality of pixel addition images.

Figure 4:
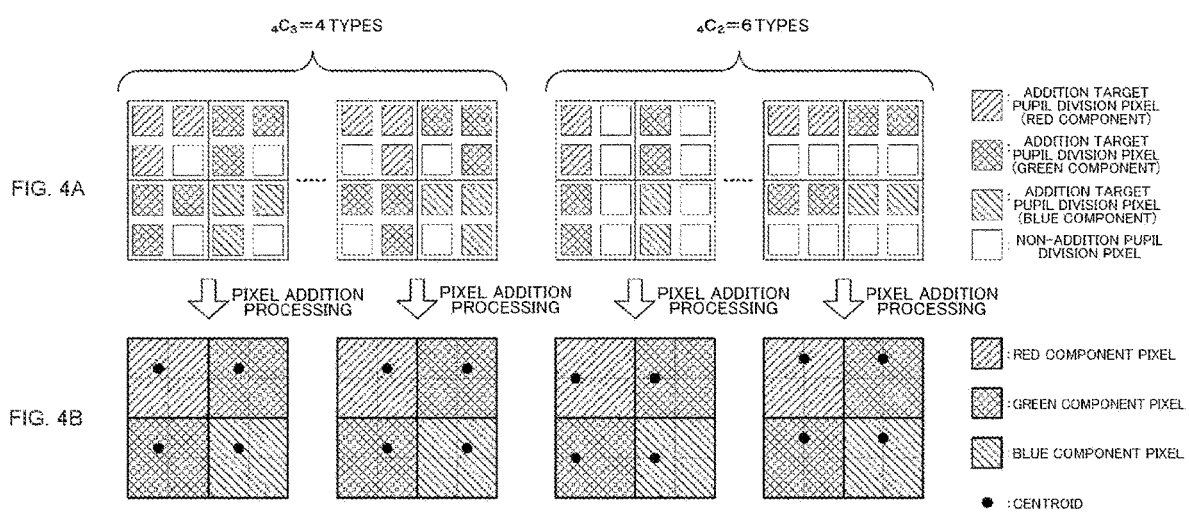
FIGS. 4A and 4B are diagrams illustrating some combinations of pupil division pixels.

FIG. 4 illustrates some combinations of pupil division pixels when the pupil division pixels of each pupil are 2×2 pixels. FIG. 4A illustrates an addition pattern, and FIG. 4B illustrates pixels of the pixel addition image. Further, a black circle in of FIG. 4B indicates a phase of a centroid of the image for each pupil unit in the pixel addition image.

For example, a combination in which three pupil division pixels from the 2×2 pixels are used is "4C3=4 types". Further, a combination in which two pupil division pixels from the 2×2 pixels are used is "4C2=6 types". Therefore, the pixel addition processing unit 35 can generate 10 pixel addition images having different combinations of division pixels. The pixel addition processing unit 35 outputs the generated pixel addition images to the super-resolution processing unit 36.

Figure 5:
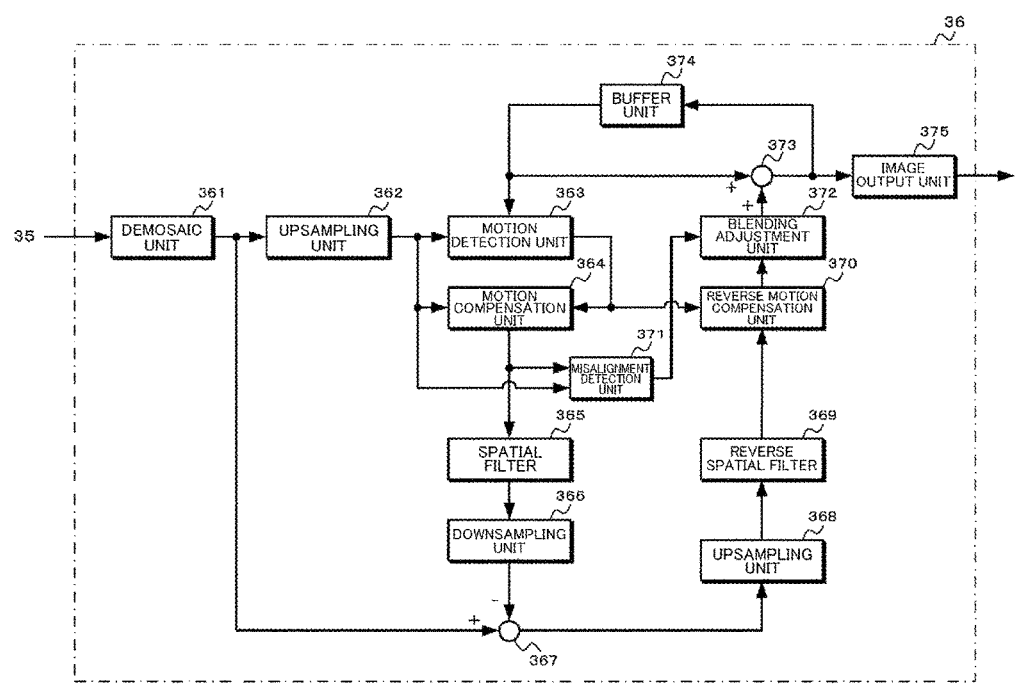
FIG. 5 is a diagram illustrating a configuration (reconstruction type) of a super-resolution processing unit.

The super-resolution processing unit 36 performs super-resolution processing using the plurality of pixel addition images generated by the pixel addition processing unit 35 to generate an output image with a higher resolution than the pixel addition image. FIG. 5 illustrates a configuration of the super-resolution processing unit. In FIG. 5, a reconstruction type configuration is illustrated.

The super-resolution processing unit 36 includes a demosaic unit 361, an upsampling unit 362, a motion detection unit 363, a motion compensation unit 364, a spatial filter 365, a downsampling unit 366, a subtraction unit 367, an upsampling unit 368, a reverse spatial filter 369, a reverse motion compensation unit 370, a misalignment detection unit 371, a blending adjustment unit 372, an addition unit 373, and a buffer unit 374.

The demosaic unit 361 performs demosaic processing on the pixel addition image supplied from the pixel addition processing unit 35 to generate a pixel addition image for each color component, and outputs the pixel addition image to the upsampling unit 362 and the subtraction unit 367.

The upsampling unit 362 performs upsampling on the pixel addition image supplied from the demosaic unit 361 to convert it to, for example, an image with a resolution of the pupil division pixel. The upsampling unit 362 outputs the pixel addition image after upsampling to the motion detection unit 363, the motion compensation unit 364, and the misalignment detection unit 371.

The motion detection unit 363 uses the pixel addition image first supplied from the upsampling unit 362 and the image subsequently supplied from the buffer unit 374 as reference images. The motion detection unit 363 detects a motion vector on the basis of the reference image and the pixel addition image subsequently supplied from the upsampling unit 362. The motion detection unit 363 outputs the detected motion vector to the motion compensation unit 364 and the reverse motion compensation unit 370.

The motion compensation unit 364 performs motion compensation on the pixel addition image supplied from the upsampling unit 362 on the basis of the motion vector detected by the motion detection unit 363. The motion compensation unit 364 outputs the pixel addition image after the motion compensation to the spatial filter 365 and the misalignment detection unit 371.

The spatial filter 365 performs processing for simulating deterioration of a spatial resolution, such as processing for causing a blur that imitates an MTF of a main lens or the like, on the image supplied from the motion compensation unit 364. The spatial filter 365 outputs the image after filter processing to the downsampling unit 366.

The downsampling unit 366 performs downsampling processing to convert the image supplied from the spatial filter 365 into an image with the same resolution as the pixel addition image supplied from the demosaic unit 361. The image subjected to the downsampling processing by the downsampling unit 366 is output to the subtraction unit 367.

The subtraction unit 367 generates a difference image indicating a difference between the pixel addition image supplied from the demosaic unit 361 and the image supplied from the downsampling unit 366. The subtraction unit 367 outputs the generated difference image to the upsampling unit 368.

The upsampling unit 368 converts the difference image supplied from the subtraction unit 367 into an image with a resolution before the downsampling was performed by the downsampling unit 366, and outputs the image to the reverse spatial filter 369.

The reverse spatial filter 369 performs filter processing having characteristics opposite to those of the spatial filter 365 on the difference image supplied from the upsampling unit 368, and outputs the difference image after filter processing to the reverse motion compensation unit 370.

The reverse motion compensation unit 370 performs motion compensation in a direction opposite to that of the motion compensation unit 364 on the basis of the motion vector from the motion detection unit 363 to generate a difference image corresponding to a position before the motion compensation was performed on the difference image supplied from the reverse spatial filter 369 by the motion compensation unit 364, and outputs the difference image to the blending adjustment unit 372.

The misalignment detection unit 371 detects an amount of misalignment between the pixel addition image signal supplied from the upsampling unit 362 and the pixel addition image after motion compensation supplied from the motion compensation unit 364, and outputs a detection result to the blending adjustment unit 372.

The blending adjustment unit 372 adjusts a signal level of the difference image supplied from the reverse motion compensation unit 370 depending on the amount of misalignment detected by the misalignment detection unit 371. The blending adjustment unit 372 lowers the signal level of the difference image as the amount of misalignment increases, for example. The blending adjustment unit 372 outputs the difference image on which level adjustment has been performed depending on the amount of misalignment to the addition unit 373 so that a blending amount of the difference image with respect to the pixel addition image supplied from the upsampling unit 362 or the buffer unit 374 to the addition unit 373 is adjusted depending on the misalignment.

The addition unit 373 adds the difference image supplied from the blending adjustment unit 372 to the pixel addition image supplied from the upsampling unit 362 or the buffer unit 374, and outputs a resultant image to the buffer unit 374 and an image output unit 375.

The buffer unit 374 stores the image supplied from the addition unit 373. Further, the buffer unit 374 outputs the stored image to the motion detection unit 363 and the addition unit 373.

The image output unit 375 outputs a result of adding the difference image finally calculated using the pixel addition images in order to the pixel addition image stored in the buffer unit 374, as an image after super-resolution processing. Further, the image output unit 375 may output an image in an angle of view range according to a zoom magnification set by a user or the like from the image after super-resolution processing and perform a seamless zoom operation from a wide angle to a telephoto.

Figure 6:
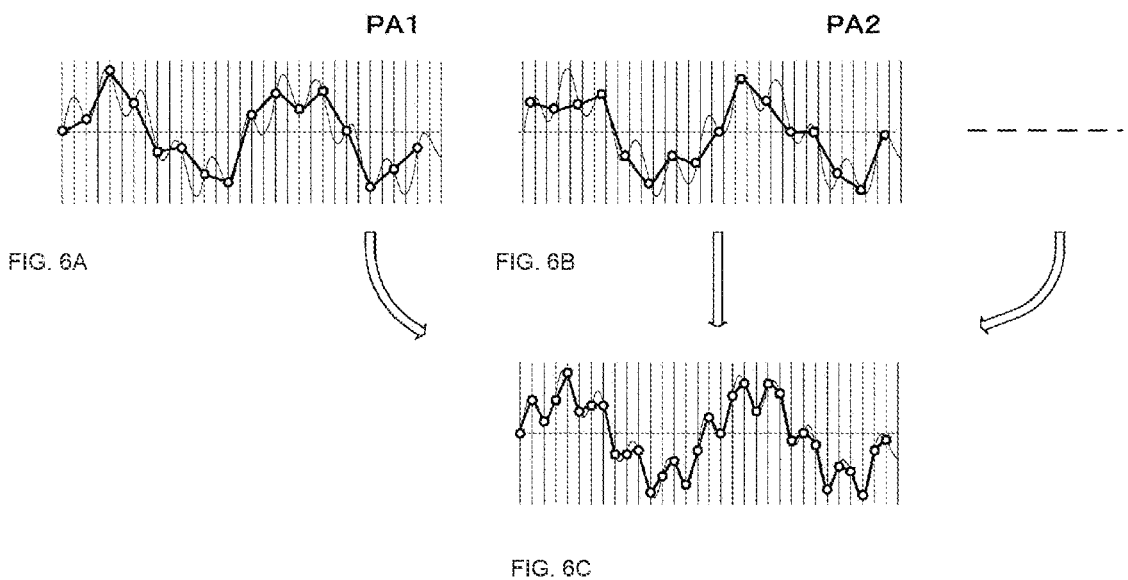
FIGS. 6A, 6B, and 6C are diagrams illustrating an operation example of the super-resolution processing unit.
Figure 7:
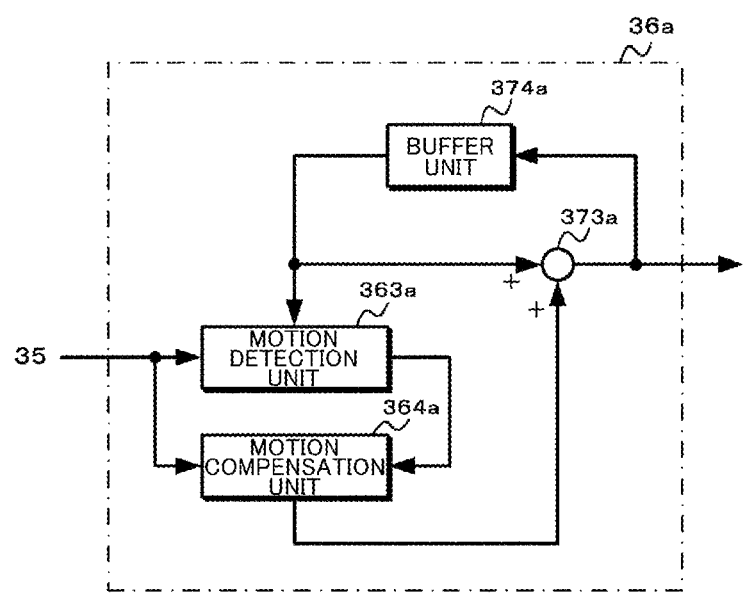
FIG. 7 is a diagram illustrating a configuration (MC interpolation type) of the super-resolution processing unit.

FIGS. 6A, 6B, and 6C are diagrams illustrating an operation example of the super-resolution processing unit. FIG. 6A illustrates a pixel addition image PA1, and FIG. 6B illustrates a pixel addition image PA2 generated using an addition pattern different from that for the pixel addition image PA1. Circles in FIGS. 6A 6B, and 6C indicate a sampling phase of the image. The super-resolution processing unit 36 performs super-resolution processing on the basis of the pixel addition image PA1 illustrated in FIG. 6A, the pixel addition image PA2 illustrated in FIG. 6B, and a pixel addition image generated using another addition pattern (not illustrated) to generate an image with a higher resolution than the pixel addition image, as illustrated in FIG. 6C. Further, using a reconstruction type super-resolution processing unit, for example, even when a phase difference between the pixel addition image PA1 and the pixel addition image PA2 differs from "½" of a sampling period of the pixel addition image PA1 as illustrated in FIG. 6B, for example, due to a difference in the addition pattern, a high-resolution image can be generated as illustrated in FIG. 6C.

The motion detection unit 363a detects a motion vector using the image input to the super-resolution processing unit 36 and the image stored in the buffer unit 374a. The motion detection unit 363a outputs the detected motion vector to the motion compensation unit 364a.

The motion compensation unit 364a performs motion compensation on the basis of the motion vector detected by the motion detection unit 363a to perform alignment of the image. The motion compensation unit 364a outputs the image after motion compensation to the addition unit 373a.

The addition unit 373a adds the image after motion compensation to the image stored in the buffer unit 374a to perform fitting pixels of an input low-resolution image to pixels in a high-resolution space. The addition unit 373a updates the image stored in the buffer unit 374a using the image after addition. Further, the addition unit 373a outputs a result of adding a last input image to the image stored in the buffer unit 374a as an image after super-resolution processing.

The super-resolution processing unit 36 is not limited to the above configuration as long as the super-resolution processing unit 36 can generate an image with a higher resolution than a plurality of pixel addition images using the plurality of pixel addition images.

Figure 8:
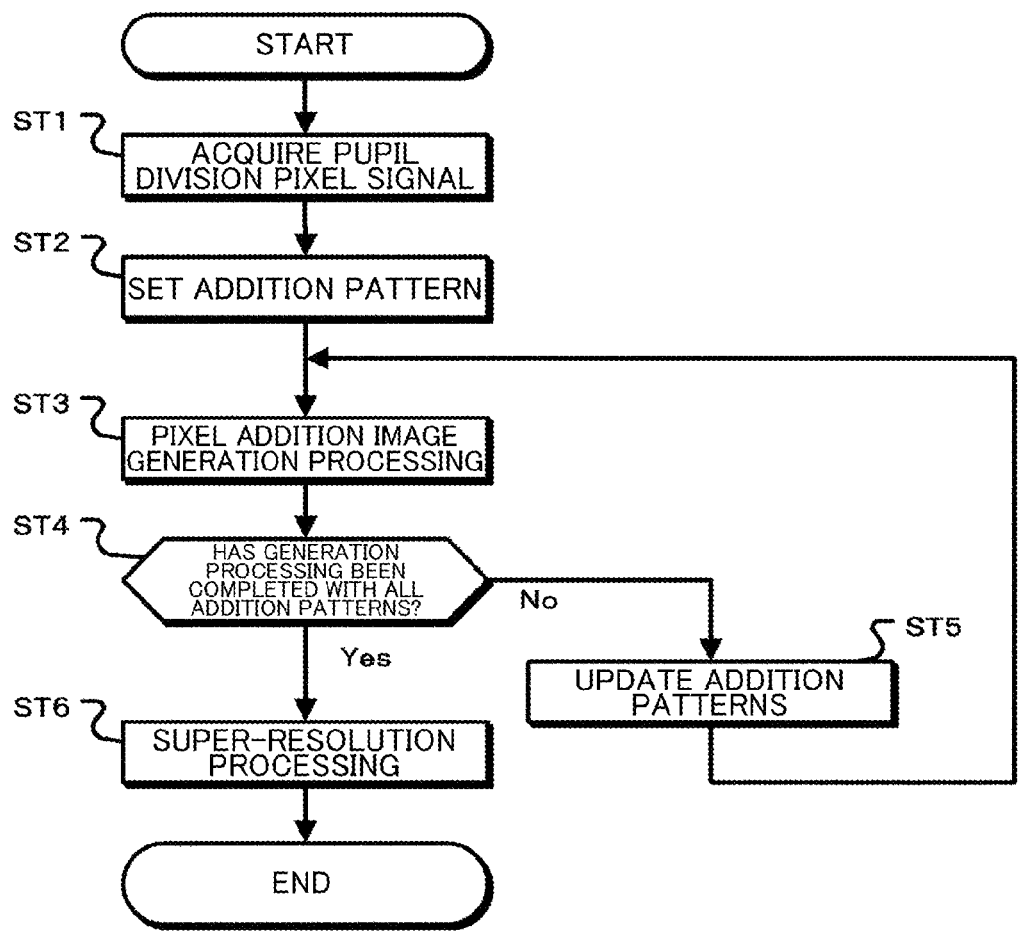
FIG. 8 is a flowchart illustrating an operation of the first embodiment.

FIG. 8 is a flowchart illustrating an operation of the first embodiment. In step ST1, the image processing unit acquires a pupil division pixel signal. The image processing unit 30 acquires a pupil division pixel signal generated by the imaging unit 20 in which an image sensor including a plurality of pupil division pixels provided directly under the on-chip lens is used, and proceeds to step ST2. In step ST2, the image processing unit sets addition patterns. The image processing unit 30 sets addition patterns that are patterns for selecting a pupil division pixel signal that is an addition processing target from the pupil division pixel signals generated by the plurality of pupil division pixels provided directly under the on-chip lens, and proceeds to step ST3.

In step ST3, the image processing unit performs pixel addition image generation processing. The image processing unit 30 selects pupil division pixel signals with the addition pattern set in step ST2, or step ST5 to be described below, adds the selected pupil division pixel signals in pupil units to generate a pixel addition image, and proceeds to step ST4.

In step ST4, the image processing unit determines whether the generation processing has been completed with all the addition patterns. The image processing unit 30 proceeds to step ST5 when there is an addition pattern with which the pixel addition image generation processing has not been performed, and proceeds to step ST6 when the pixel addition image generation processing has been performed with all the addition patterns.

In step ST5, the image processing unit updates the addition patterns. The image processing unit 30 newly selects the addition patterns from the addition patterns with which the pixel addition image generation processing has not been performed, and returns to step ST3.

In step ST6, the image processing unit performs super-resolution processing. The image processing unit 30 performs super-resolution processing using the plurality of pixel addition images generated by adding the pixel signals of the pupil division pixels in pupil units with different addition patterns to generate an output image with a higher resolution than the pixel addition image generated in step ST3.

Thus, according to the first embodiment, since the pixel addition image is generated by adding the pupil division pixels, an influence of a difference in an amount of light incident on each pupil division pixel can be reduced depending on an incidence angle of subject light. Further, it is possible to reduce, for example, blurring or phase shift caused by color mixing between the same colors, or false colors caused by frequency characteristics of spatial resolution, which occur in the pupil division pixels directly under the on-chip lens. It is also possible to reduce broken images caused by the subject light input to the pupil division pixels directly under the on-chip lens at the time of focusing being input across the plurality of pupil division pixels directly under the on-chip lens at the time of non-focusing. That is, according to the first embodiment, it is possible to generate a pixel addition image having high image quality. Further, in the first embodiment, since the super-resolution processing is performed using the plurality of pixel addition images generated through the pixel addition with different addition patterns, an output image with high image quality and high resolution can be generated.

3. SECOND EMBODIMENT

Incidentally, in an image sensor, a sensitivity difference may occur between pixels, and when a pupil division pixel signal generated by an image sensor having a sensitivity difference between pixels is used, an influence appears a sensitivity difference in an image generated by super-resolution processing. This makes it not possible to generate a high-resolution output image with high image quality. Therefore, in the second embodiment, it is possible to generate a high-resolution output image in which an influence of a sensitivity difference between pixels does not occur.

Figure 9:
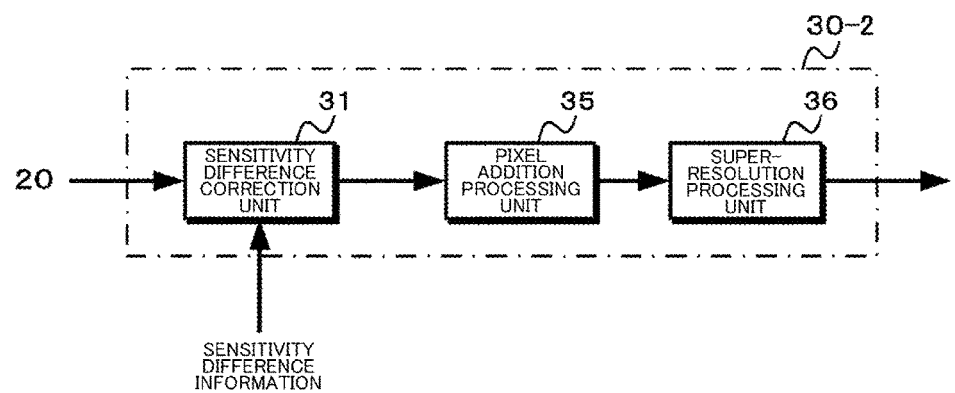
FIG. 9 is a diagram illustrating a configuration of a second embodiment.

FIG. 9 illustrates a configuration of the second embodiment. An image processing unit 30 includes a sensitivity difference correction unit 31, a pixel addition processing unit 35, and a super-resolution processing unit 36. The sensitivity difference correction unit 31 acquires sensitivity difference information of the image sensor 21 in the imaging unit 20. As the sensitivity difference information, a sensitivity difference of the image sensor 21 detected in advance, a correction coefficient for correcting the sensitivity difference, or the like is used. The sensitivity difference information may be stored in, for example, the imaging unit 20, or may be stored in a recording medium or the like associated with the imaging unit 20. The sensitivity difference correction unit 31 performs sensitivity difference correction between pupil division pixels on a pupil division pixel signal using the sensitivity difference information acquired from the imaging unit 20 or the sensitivity difference information read from a recording medium or the like. The sensitivity difference correction unit 31 outputs the pupil division pixel signal after the sensitivity difference correction to the pixel addition processing unit 35. The pixel addition processing unit 35 performs pixel addition processing in pupil units on the basis of the addition pattern to generate a pixel addition image in which the pupil units are units of one color component. Further, the pixel addition processing unit 35 performs pixel addition processing of the pupil division pixels with different addition patterns to generate a plurality of pixel addition images. The pixel addition processing unit 35 outputs the pixel addition image generated for each addition pattern to the super-resolution processing unit 36.

The super-resolution processing unit 36 performs super-resolution processing using the plurality of pixel addition images generated by the pixel addition processing unit 35 to generate an output image with a higher resolution than that of the pixel addition image.

Figure 10:
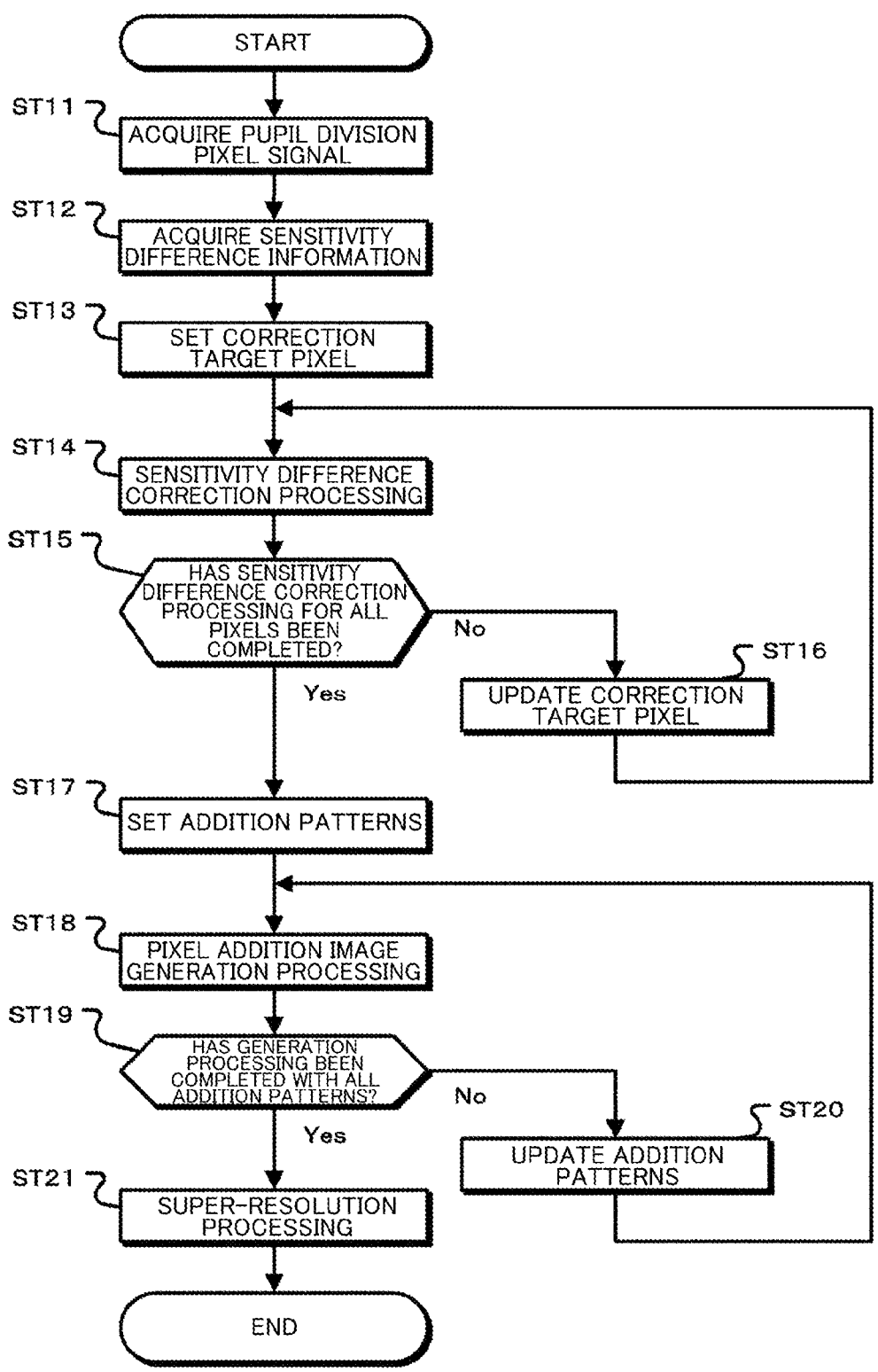
FIG. 10 is a flowchart illustrating an operation of the second embodiment.

FIG. 10 is a flowchart illustrating an operation of the second embodiment. In step ST11, the image processing unit acquires the pupil division pixel signal. The image processing unit 30 acquires the pupil division pixel signal generated by the imaging unit 20 in which an image sensor including a plurality of pupil division pixels directly under the on-chip lens is used, and proceeds to step ST12.

In step ST12, the image processing unit acquires the sensitivity difference information. The image processing unit 30 acquires the sensitivity difference information from the imaging unit 20 or the recording medium or the like associated with the imaging unit 20, and proceeds to step ST13.

In step ST13, the image processing unit sets a correction target pixel. The image processing unit 30 sets a correction target pixel on which sensitivity difference correction is performed and proceeds to step ST14.

In step ST14, the image processing unit performs sensitivity difference correction processing. The image processing unit 30 performs sensitivity difference correction on the correction target pixel on the basis of the sensitivity difference information corresponding to the correction target pixel, and proceeds to step ST15.

In step ST15, the image processing unit determines whether the sensitivity difference correction processing for all pixels has been completed. The image processing unit 30 proceeds to step ST16 when there is a pupil division pixel on which the sensitivity difference correction processing has not been performed, and proceeds to step ST17 when the sensitivity difference correction processing has been performed on all the pupil division pixels.

In step ST16, the image processing unit updates the correction target pixel. The image processing unit 30 newly selects the pupil division pixel from the pupil division pixels on which the sensitivity difference correction processing has not been performed, sets the pupil division pixel as the correction target pixel, and returns to step ST14.

When processing proceeds from step ST15 to step ST17, the image processing unit sets the addition patterns. The image processing unit 30 sets addition patterns that are patterns for selecting a pupil division pixel signal that is an addition processing target from the pupil division pixel signals generated by the plurality of pupil division pixels provided directly under the on-chip lens, and proceed to step ST18.

In step ST18, the image processing unit performs pixel addition image generation processing. The image processing unit 30 selects pupil division pixel signals with the addition pattern set in step ST17, or step ST20 to be described below, adds the selected pupil division pixel signals in pupil units to generate a pixel addition image, and proceeds to step ST19.

In step ST19, the image processing unit determines whether the generation processing has been completed with all the addition patterns. The image processing unit 30 proceeds to step ST20 when there is an addition pattern with which the pixel addition image generation processing has not been performed, and proceeds to step ST21 when the pixel addition image generation processing has been performed with all the addition patterns.

In step ST20, the image processing unit updates the addition patterns. The image processing unit 30 newly selects the addition patterns from the addition patterns with which the pixel addition image generation processing has not been performed, and returns to step ST18.

In step ST21, the image processing unit performs super-resolution processing. The image processing unit 30 performs super-resolution processing using the plurality of pixel addition images generated by adding the pixel signals of pupil division pixels in pupil units with different addition patterns to generate an output image with a higher resolution than that of the pixel addition image generated in step ST18.

Thus, according to the second embodiment, not only a high-resolution image can be generated with high image quality as in the first embodiment, but also an output image in which the influence of the sensitivity difference of the image sensor is less than that of the first embodiment can be generated.

4. THIRD EMBODIMENT

Next, a third embodiment will be described. In the third embodiment, a case in which an addition pattern for generating a pixel addition image is selected depending on characteristics of an input image to generate a high-resolution output image with high image quality at a lower calculation cost than in a case in which the pixel addition image is generated with all addition patterns will be described.

Figure 11:
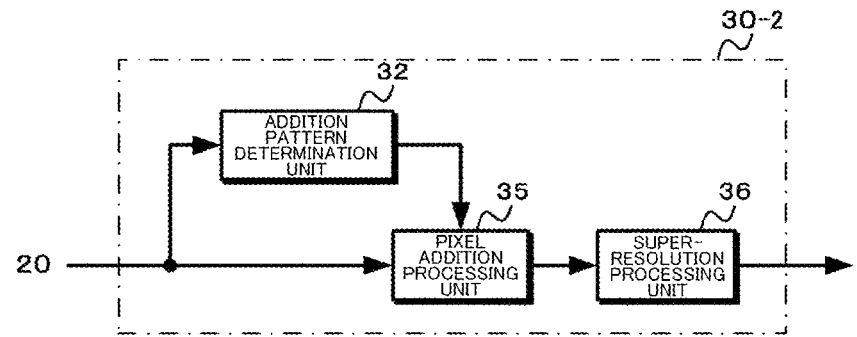
FIG. 11 is a diagram illustrating a configuration of a third embodiment.

FIG. 11 illustrates a configuration of a third embodiment. An image processing unit 30 includes an addition pattern determination unit 32, a pixel addition processing unit 35, and a super-resolution processing unit 36. An addition pattern is selected depending on characteristics of an input image.

Figure 12:
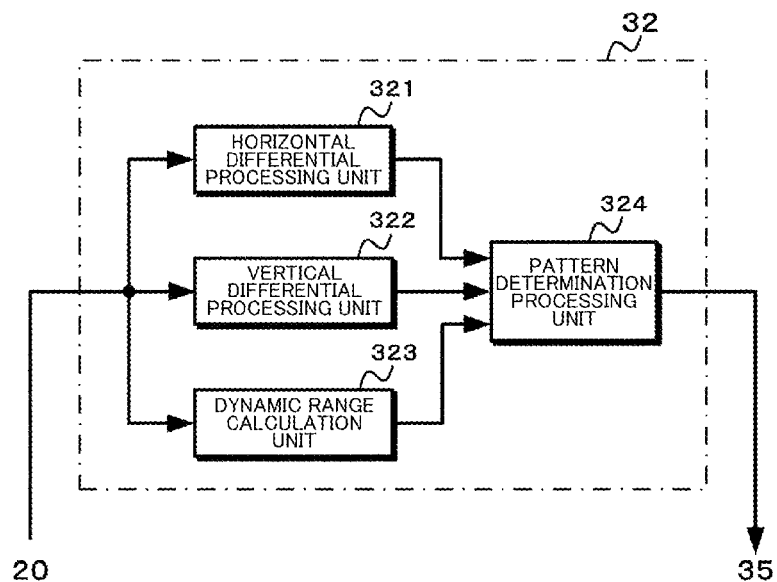
FIG. 12 is a diagram illustrating a configuration of an addition pattern determination unit.

FIG. 12 illustrates a configuration of the addition pattern determination unit. The addition pattern determination unit 32 includes a horizontal differential processing unit 321, a vertical differential processing unit 322, a dynamic range calculation unit 323, and a pattern determination processing unit 324.

The horizontal differential processing unit 321, the vertical differential processing unit 322, and the dynamic range calculation unit 323 calculate image characteristic information indicating the characteristics of the input image.

The horizontal differential processing unit 321 performs differential processing in a horizontal direction using a target pixel (referred to as a "processing target pixel") of pixel addition processing and peripheral pixels to calculate a horizontal differential component indicating an edge in a vertical direction, and outputs the horizontal differential component to the pattern determination processing unit 324. Further, the vertical differential processing unit 322 performs vertical differential processing using the processing target pixel and peripheral pixels to calculate a vertical differential component indicating an edge in the horizontal direction, and outputs the vertical differential component to the pattern determination processing unit 324. The dynamic range calculation unit 323 calculates a dynamic range using the processing target pixel and the peripheral pixels and outputs the dynamic range to the pattern determination processing unit 324.

The pattern determination processing unit 324 selects the addition pattern so that a high-resolution image is obtained at an edge portion or an uneven portion without using all the addition patterns, on the basis of the image characteristic information, that is, a result of calculating a horizontal differential component, a vertical differential component, and a dynamic range.

Figure 14A:
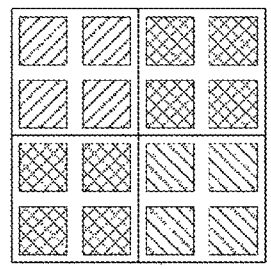

FIG. 13 illustrates an addition pattern determination operation, and FIGS. 14A, 14B, 14C, and 14D illustrates the addition patterns. For example, when a horizontal differential component and a vertical differential component are not detected and a dynamic range Sd is equal to or smaller than a preset threshold value THd, the processing target pixels are pixels in a flat portion and it is not necessary to improve the resolution. Therefore, only all-pixel addition is performed, as illustrated in FIG. 14A.

Further, when a horizontal differential component Sh is larger than a preset threshold value THh, a vertical differential component Sv is equal to or smaller than a preset threshold value THv, and the dynamic range Sd is larger than the threshold value THd, the processing target pixel is a pixel indicating a vertical line pattern and thus, it is preferable to improve a horizontal resolution. Therefore, an addition pattern of only horizontal addition illustrated in FIG. 14B is used.

Further, when the horizontal differential component Sh is equal to or smaller than the threshold value THh, the vertical differential component Sv is larger than the threshold value THv, and the dynamic range Sd is larger than the threshold value THd, the processing target pixel is a pixel indicating a horizontal line pattern and thus, it is preferable to improve a vertical resolution. Therefore, an addition pattern of only vertical addition illustrated in FIG. 14C is used.

Further, when the horizontal differential component Sh is larger than the threshold value THh, the vertical differential component Sv is larger than the threshold value THv, and the dynamic range Sd is larger than the threshold value THd, the processing target pixel is a pixel indicating a diagonal line pattern and thus, it is preferable to improve an oblique resolution. Therefore, an addition pattern of only diagonal addition illustrated in FIG. 14D is used.

FIGS. 14A, 14B, 14C, and 14D illustrate the addition patterns in pixel addition processing for two pupil division pixels, but in the case of pixel addition processing for three pupil division pixels, all four addition patterns are used. Further, since a phase pattern does not increase in vertical addition and horizontal addition, all the addition patterns may be used without being selected.

The addition pattern determination unit 32 outputs addition pattern information indicating the addition pattern selected on the basis of a result of detecting the horizontal differential component, the vertical differential component, and the dynamic range to the pixel addition processing unit 35. The addition pattern determination unit 32 is not limited to a case in which all of the horizontal differential component, the vertical differential component, and the dynamic range are calculated as the image characteristic information, and at least one of these may be calculated and addition pattern information indicating the addition pattern selected on the basis of the image characteristic information may be output to the pixel addition processing unit 35.

The pixel addition processing unit 35 adds the pupil division pixel signals in pupil units with an addition pattern on the basis of the addition pattern information supplied from the addition pattern determination unit 32 to generate a pixel addition image for each addition pattern. The pixel addition processing unit 35 outputs the generated pixel addition image to the super-resolution processing unit The super-resolution processing unit 36 performs super-resolution processing using the plurality of pixel addition images generated by the pixel addition processing unit 35 to generate an output image with a higher resolution than that of the pixel addition image.

Figure 15:
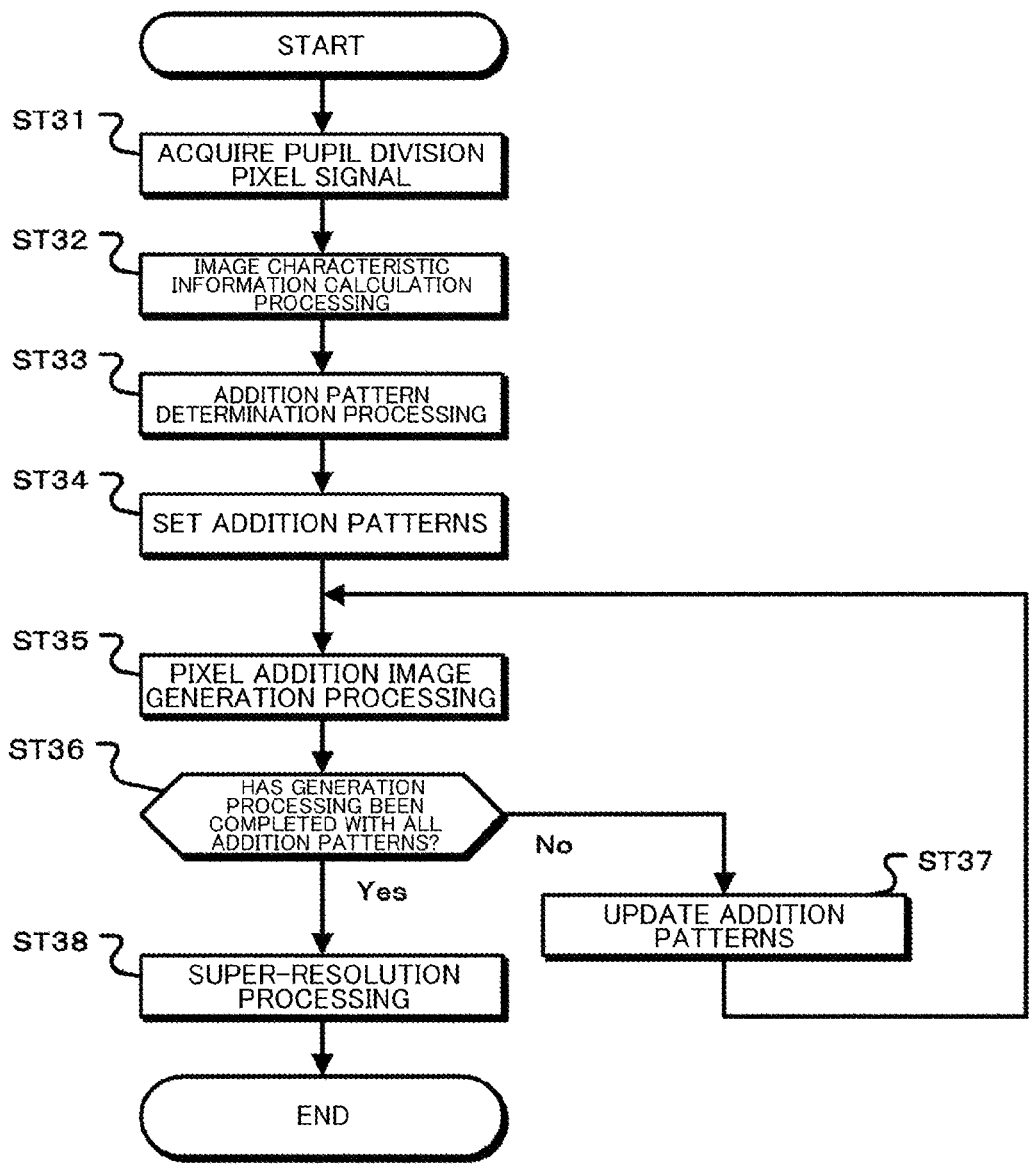
FIG. 15 is a flowchart illustrating an operation of the third embodiment.

FIG. 15 is a flowchart illustrating an operation of the third embodiment. In step ST31, the image processing unit acquires the pupil division pixel signal. The image processing unit 30 acquires a pupil division pixel signal generated by the imaging unit 20 in which an image sensor including a plurality of pupil division pixels directly under the on-chip lens is used, and proceeds to step ST32.

In step ST32, the image processing unit performs processing for calculating image characteristic information. The image processing unit 30 calculates, for example, a horizontal differential component, a vertical differential component, and a dynamic range as the image characteristic information using the pupil division pixel signal acquired in step ST31, and proceeds to step ST33.

In step ST33, the image processing unit performs addition pattern determination processing. The image processing unit 30 determines the addition pattern that is used in the pixel addition processing on the basis of the image characteristic information calculated in step ST32, and proceeds to step ST34.

In step ST34, the image processing unit sets the addition patterns. The image processing unit 30 sets the addition patterns to be used for pixel addition processing from the addition patterns determined in step ST33, and proceeds to step ST35.

In step ST35, the image processing unit performs pixel addition image generation processing. The image processing unit 30 selects the pupil division pixel signals with the addition pattern set in step ST34, or step ST37 to be described below, adds the selected pupil division pixel signals in pupil units to generate a pixel addition image, and proceeds to step ST36.

In step ST36, the image processing unit determines whether the generation processing has been completed with all the addition patterns. The image processing unit 30 proceeds to step ST37 when there is an addition pattern with which the pixel addition image generation processing has not been performed among the addition patterns determined to be used for pixel addition processing in step ST33, and proceeds to step ST38 when the pixel addition image generation processing has been performed with all the addition patterns.

In step ST37, the image processing unit updates the addition patterns. The image processing unit 30 newly selects the addition patterns from the addition patterns with which the pixel addition image generation processing has not been performed, and returns to step ST35.

In step ST38, the image processing unit performs super-resolution processing. The image processing unit 30 performs super-resolution processing using the plurality of pixel addition images generated by adding pixel signals of pupil division pixels in pupil units with different addition patterns to generate an output image with a higher resolution than that of the pixel addition image generated in step ST35.

Thus, according to the third embodiment, not only a high-resolution image can be generated with high image quality as in the first embodiment, but also a high-resolution image can be generated with high image quality by using the pixel addition images of a smaller number of addition patterns than those in the first embodiment.

5. OTHER EMBODIMENTS

Figure 16A:
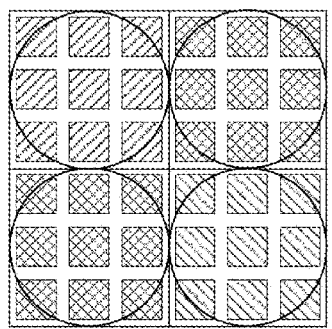
FIGS. 16A and 16B is a are diagrams illustrating another configuration of the imaging unit.
Figure 16B:
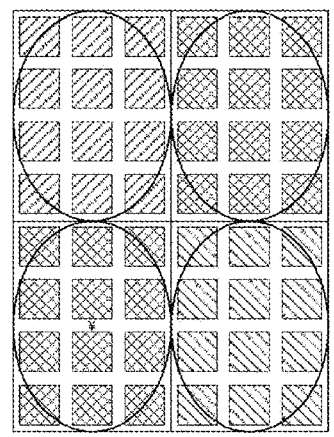

In the imaging unit 20 of the above-described embodiment, a case in which the 2×2 pupil division pixels are provided directly under the on-chip lens has been illustrated, but the present technology is not limited to the 2×2 pixels as long as there are a plurality of pupil division pixels directly under the on-chip lens. FIGS. 16A and 16B illustrate another configuration of the imaging unit, and for example, 3×3 pupil division pixels may be provided directly under the on-chip lens, as illustrated in FIG. 16A. Further, the pupil division pixels directly under the on-chip lens may be provided with different numbers of pixels in a vertical direction and a horizontal direction, as illustrated in FIG. 16B.

Further, a color array in the pupil units in the imaging unit 20 is not limited to the Bayer array, and, for example, a configuration in which red component pixels, green component pixels, blue component pixels, and white component pixels are provided in a 2×2 pixel region may be adopted. Further, the imaging unit 20 is not limited to the case in which pupil division pixel signals of three primary colors are generated, and may generate a pixel signal of a black-and-white image or a complementary color system pixel signal as the pupil division pixel signal.

Figure 17A:
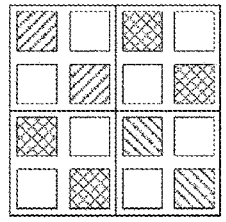
FIGS. 17A, 17B, 17C, and 17D are diagrams illustrating a case in which phases of centroids of an image are the same.
Figure 17B:
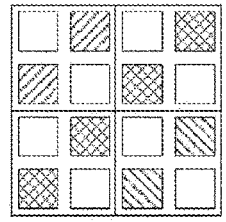

Further, in the determination of the addition pattern, duplication of the addition patterns in which the phases of the centroids of the image are the same in the pixel addition may be avoided. FIGS. 17A, 17B, 17C, and 17D illustrate a case in which the phases of the centroids of the image are the same, and FIGS. 17A and 17B illustrate different addition patterns.

Figure 17C:
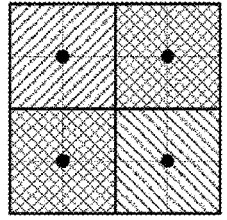
Figure 17D:
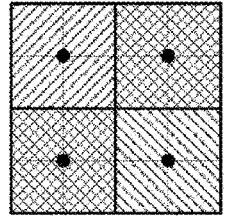

Here, when pixel addition of the pupil division pixels has been performed with the addition pattern of FIG. 17A, phases of the pixel addition image signals are as shown in FIG. 17C. Similarly, when pixel addition of the pupil division pixels has been performed with the addition pattern of FIG. 17B different from the addition pattern of FIG. 17A, centroids of the pixel addition image signals are as shown in FIG. 17D. Since phases of the centroids are the same in (FIGS. 17C and 17D, the pixel addition processing unit may use the addition pattern of either FIGS. 17A and 17B, thereby reducing the number of addition patterns.

6. APPLICATION EXAMPLES

The technology according to the present disclosure can be applied to various fields. For example, the technology according to the present disclosure may be realized as a device mounted in a moving body of any kind such as an automobile, an electric vehicle, a hybrid electric vehicle, a motorcycle, a bicycle, a personal mobility, an airplane, a drone, a ship, and a robot. Further, the technology may be realized as a device mounted in equipment that is used in a production process in a factory or equipment that is used in a construction field. When the technology is applied to such a field, a high-resolution image with high image quality can be generated and thus, automated driving and the like can be performed more safely.

Further, the technology according to the present disclosure can also be applied to the medical field. For example, if the technology is applied to a case in which a captured image of a surgical site is acquired when surgery is performed, a high-resolution image with high image quality can be generated and thus, surgeon's fatigue can be reduced or the surgery can be performed safely and more reliably.

The series of processing described in the specification can be executed by hardware, software, or a composite configuration of both. When the processing is executed by software, a program in which a processing sequence has been recorded is installed in a memory in a computer embedded in dedicated hardware and executed. Alternatively, the program can be installed in a general-purpose computer capable of executing various types of processing and executed.

For example, the program can be recorded in advance on a hard disk, a solid state drive (SSD), or a read only memory (ROM) as a recording medium. Alternatively, the program can be temporarily or permanently stored (recorded) on a removable recording medium such as a flexible disc, a compact disc read only memory (CD-ROM), a magneto optical (MO) disc, a digital versatile disc (DVD), a Blu-Ray Disc (BD; registered trademark), a magnetic disk, or a semiconductor memory card. Such a removable recording medium can be provided as so-called package software.

Further, the program may be transferred from a download site to the computer wirelessly or by wire via a network such as a local area network (LAN) or the Internet, in addition to being installed in the computer from the removable recording medium. The computer can receive the program transferred in this way and install the program in a recording medium such as a built-in hard disk.

The effects described in the present specification are merely examples and are not limited, and there may be additional effects not described. Further, the present technology should not be construed as being limited to the embodiments of the technology described above. The embodiments of the present technology disclose the present technology in the form of examples, and it is obvious that a person skilled in the art can modify or substitute the embodiments without departing from the gist of the present technique. That is, claims should be taken into consideration in order to determine the gist of the present technology.

Further, the image processing device of the present technology can also have the following configurations.

(1) An image processing device including:

a pixel addition processing unit configured to add pupil division pixel signals with addition patterns in pupil units to generate a pixel addition image signal for each addition pattern, with the addition patterns as a plurality of different patterns; and an image generation processing unit configured to perform image processing using the pixel addition image signal generated for each addition pattern by the pixel addition processing unit to generate an image signal with a higher resolution than that of the pixel addition image signal.

(2) The image processing device according to (1), including:

a sensitivity difference correction unit configured to correct an inter-pixel sensitivity difference between pupil division pixels, wherein the pixel addition processing unit uses the pupil division pixel signals in which a sensitivity difference has been corrected by the sensitivity difference correction unit.

(3) The image processing device according to (1) or (2), further including an image characteristic information calculation unit configured to calculate image characteristic information using the pupil division pixel signals; and a pattern determination unit configured to determine an addition pattern to be used in the pixel addition processing unit on the basis of the image characteristic information calculated by the image characteristic information calculation unit.

(4) The image processing device according to (3), wherein the characteristic information calculation unit calculates at least one of a horizontal differential component, a vertical differential component, and a dynamic range using the pupil division pixel signals as the image characteristic information.

(5) The image processing device according to any one of (1) to (4), wherein the pixel addition processing unit generates the pixel addition image signal by avoiding duplication of addition patterns in which phases of centroids of the image are the same in pixel addition.

Further, the imaging device of the present technology can also have the following configurations.

(1) An imaging device including:

an imaging unit using an image sensor, the image sensor including a plurality of pupil division pixels subjected to pupil division;

a pixel addition processing unit configured to add the pupil division pixel signals generated by the imaging unit with addition patterns in pupil units to generate a pixel addition image signal for each addition pattern, with the addition pattern as a plurality of different patterns; and an image generation processing unit configured to perform image processing using the plurality of pixel addition images generated by the pixel addition processing unit to generate an output image with a higher resolution than that of the pixel addition image.

(2) The imaging device according to (1), further including: a sensitivity difference correction unit configured to perform sensitivity difference correction of the pupil division pixels on the basis of sensitivity difference information regarding the sensitivity difference between the pupil division pixels of the image sensor, wherein the pixel addition processing unit generates the pixel addition image using the pupil division pixels in which a sensitivity difference has been corrected by the sensitivity difference correction unit.

(3) The imaging device according to (2), wherein the imaging unit has the sensitivity difference information regarding the sensitivity difference between the pupil division pixels in the image sensor, and the sensitivity difference correction unit acquires the sensitivity difference information from the imaging unit.

(4) The imaging device according to any one of (1) to (3), wherein the pupil units are color component units or white color in the imaging unit.

REFERENCE SIGNS LIST

10 Imaging system
20 Imaging unit
21 Image sensor
22 On-chip lens
23 Color filter
24 Optical detection unit
25 Element separation layer
30 Image processing unit
31 Sensitivity difference correction unit
32 Addition pattern determination unit
35 Pixel addition processing unit
36 Super-resolution processing unit
211 Pupil division pixel
321 Horizontal differential processing unit
322 Vertical differential processing unit
323 Dynamic range calculation unit
324 Pattern determination processing unit
361 Demosaic unit
362, 368 Upsampling unit
363, 363a Motion detection unit
364, 364a Motion compensation unit
365 Spatial filter
366 Downsampling unit
367 Subtraction unit
369 Reverse spatial filter
370 Reverse motion compensation unit
371 Misalignment detection unit
372 Blending adjustment unit
373, 373a Addition unit
374, 374a Buffer unit
375 Image output unit

The invention claimed is:

1. An image processing device, comprising:
circuitry configured to:
correct pupil division pixel signals of pupil division pixels to correct an inter-pixel sensitivity difference between the pupil division pixels;
add the corrected pupil division pixel signals pupil units of the pupil division pixels with different addition patterns;
generate, based on the added pupil division pixel signals, respective pixel addition images for the different addition patterns; and
generate, based on the generated pixel addition images, an output image with a resolution higher than resolutions of the generated pixel addition images.

2. The image processing device according to claim 1, wherein the circuitry is further configured to:
calculate image characteristic information based on the pupil division pixel signals of the pupil division pixels; and
determine an addition pattern of the different addition patterns to be used in the generation of the pixel addition images, wherein the determination of the addition pattern is based on the calculated image characteristic information.

3. The image processing device according to claim 2, wherein the circuitry is further configured to calculate, based on the pupil division pixel signals of the pupil division pixels, at least one of a horizontal differential component associated with the pupil division pixels, a vertical differential component associated with the pupil division pixels, or a dynamic range associated with the pupil division pixels as the image characteristic information.

4. The image processing device according to claim 1, wherein the circuitry is further configured to generate the pixel addition images based on avoidance of duplication of a set of addition patterns in which phases of centroids of addition image signals are the same, wherein the different addition patterns include the set of addition patterns.

5. An image processing method, comprising:
correcting pupil division pixel signals of pupil division pixels to correct an inter-pixel sensitivity difference between the pupil division pixels;
adding the corrected pupil division pixel signals in pupil units of the pupil division pixels with different addition patterns;
generating, based on the added pupil division pixel signals, respective pixel addition images for the different addition patterns; and
generating, based on the generated pixel addition images, an output image with a resolution higher than resolutions of the generated pixel addition images.

6. An imaging device, comprising:
an imaging unit that includes an image sensor, wherein
the image sensor includes pupil division pixels subjected to pupil division, and
the imaging unit is configured to generate pupil division pixel signals for the pupil division pixels;
circuitry configured to:
correct, based on sensitivity difference information regarding a sensitivity difference between the pupil division pixels of the image sensor, the pupil division pixel signals of the pupil division pixels;
add the corrected pupil division pixel signals in pupil units of the pupil division pixels with different addition patterns;
generate, based on the added pupil division pixel signals, respective pixel addition images for the different addition patterns; and
generate, based on the generated pixel addition images, an output image with a resolution higher than resolutions of the generated pixel addition images.

7. The imaging device according to claim 6, wherein
the imaging unit is further configured to store the sensitivity difference information regarding the sensitivity difference between the pupil division pixels in the image sensor, and
the circuitry is further configured to acquire the sensitivity difference information from the imaging unit.

8. The imaging device according to claim 6, wherein the pupil units are color component units or white in the imaging unit.

9. An image processing device, comprising:
circuitry configured to:
calculate image characteristic information based on pupil division pixel signals of pupil division pixels, wherein the image characteristic information includes at least one of a horizontal differential component associated with the pupil division pixels, a vertical differential component associated with the pupil division pixels, or a dynamic range associated with the pupil division pixels;
determine an addition pattern from different addition patterns based on the calculated image characteristic information;
add the pupil division pixel signals in pupil units of the pupil division pixels with the determined addition pattern;
generate, based on the added pupil division pixel signals, a pixel addition image for the addition pattern; and
generate, based on the generated pixel addition image, an output image with a resolution higher than a resolution of the generated pixel addition image.

10. An image processing device, comprising:
circuitry configured to:
determine a first set of addition patterns from different addition patterns based on avoidance of duplication of a second set of addition patterns in which phases of centroids of image signals are the same, wherein the different addition patterns include the second set of addition patterns;
add pupil division pixel signals in pupil units of pupil division pixels with the determined first set of addition patterns;
generate, based on the added pupil division pixel signals, respective pixel addition images for the first set of addition patterns; and
generate, based on the generated pixel addition images, an output image with a resolution higher than resolutions of the generated pixel addition images.

* * * * *